Nov. 24, 1959    R. H. KRESS    2,914,337
VEHICLE WHEEL SUSPENSION STRUCTURE
Filed Nov. 30, 1956    4 Sheets-Sheet 1
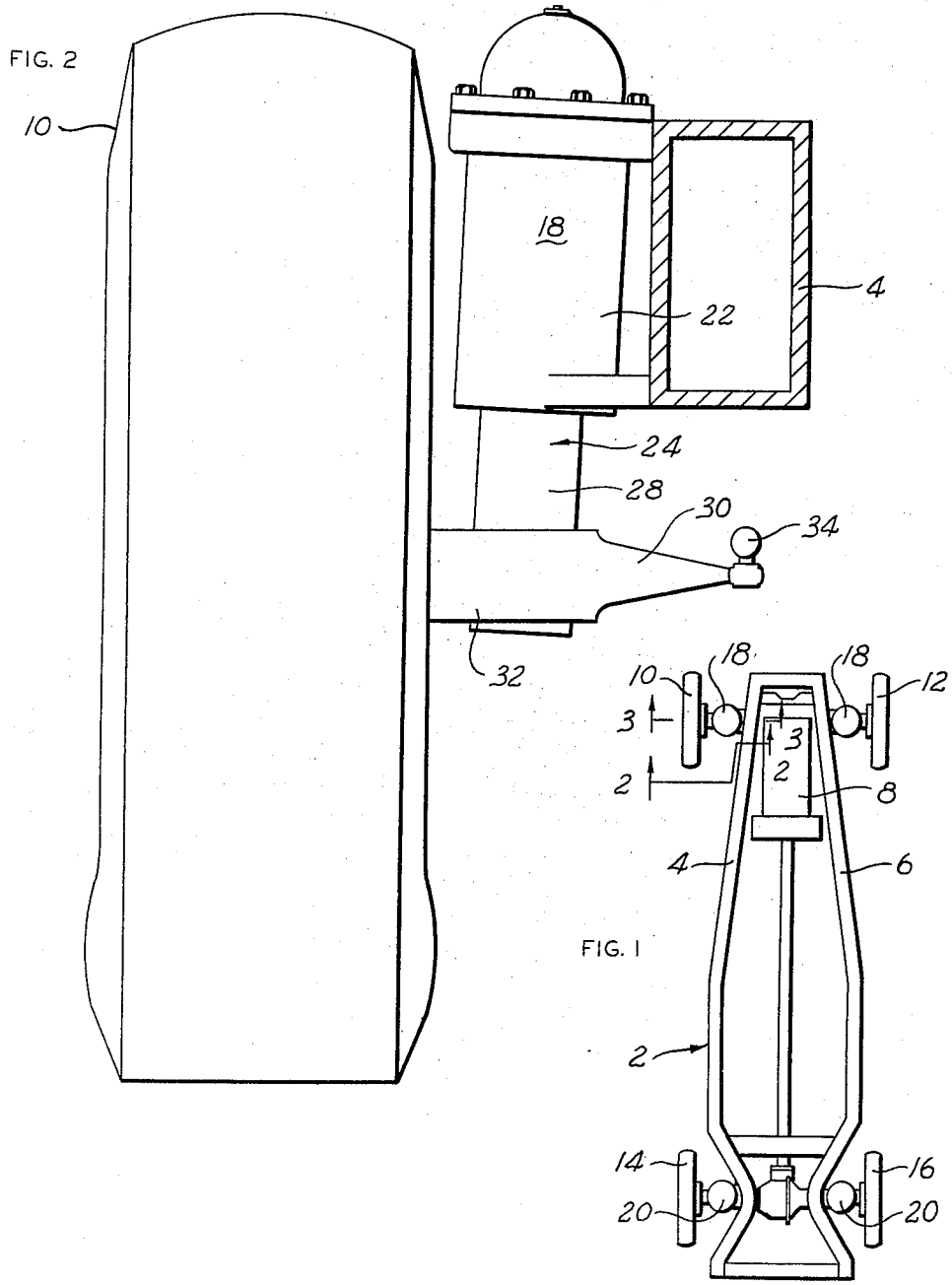
INVENTOR:
RALPH H. KRESS
BY John F. Schmidt
ATTORNEY

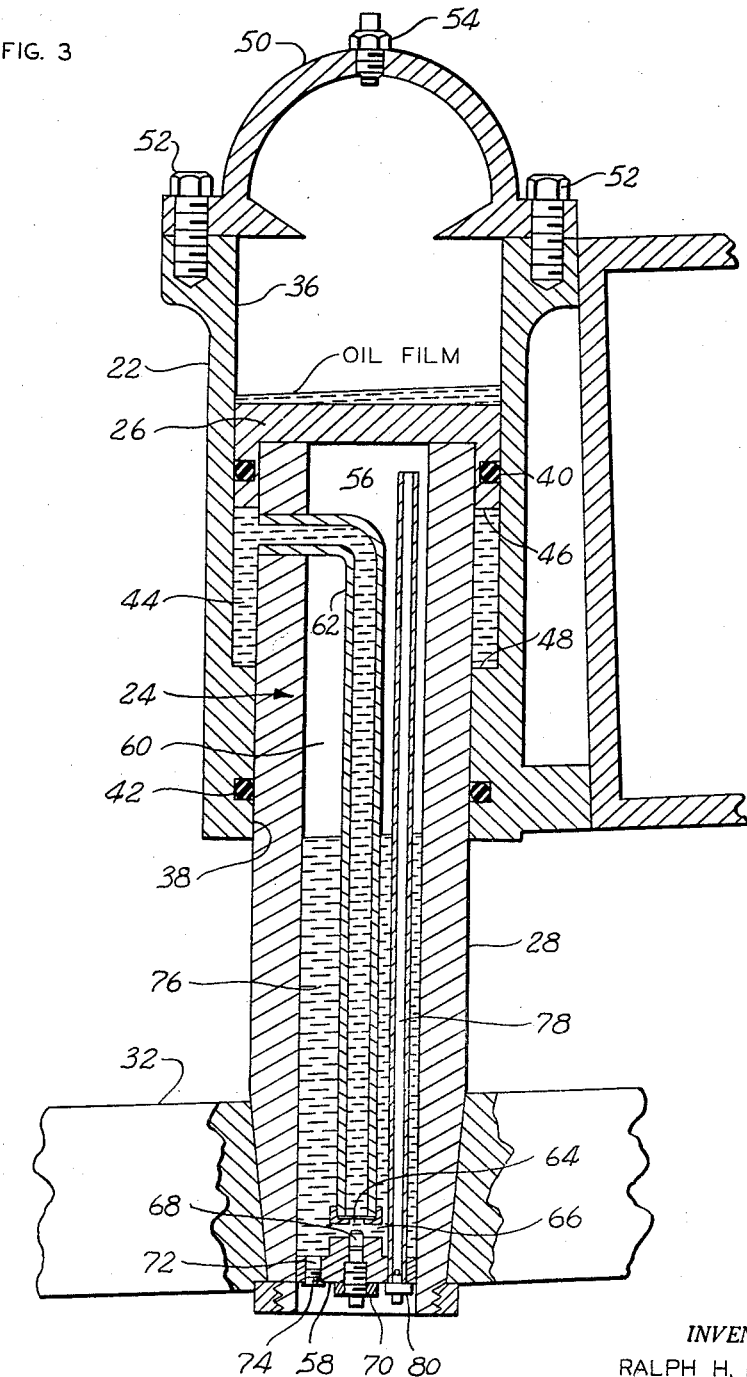

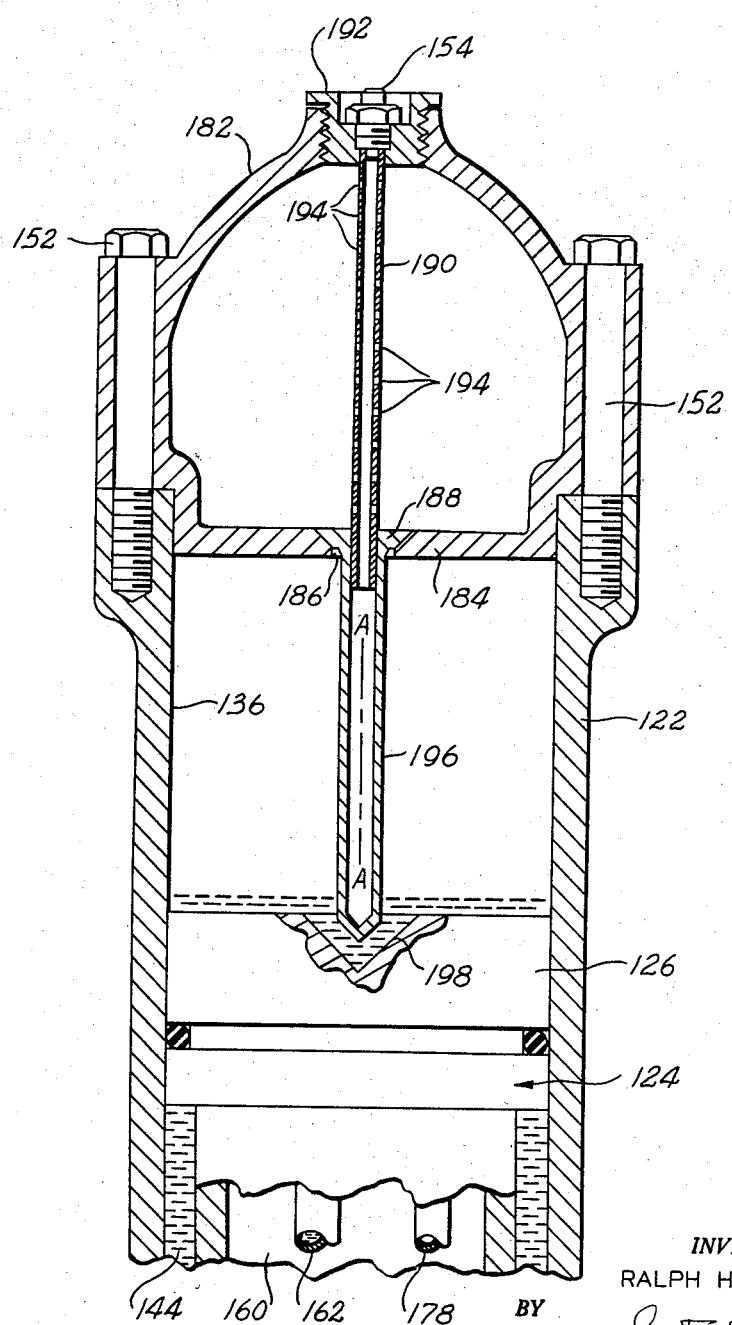

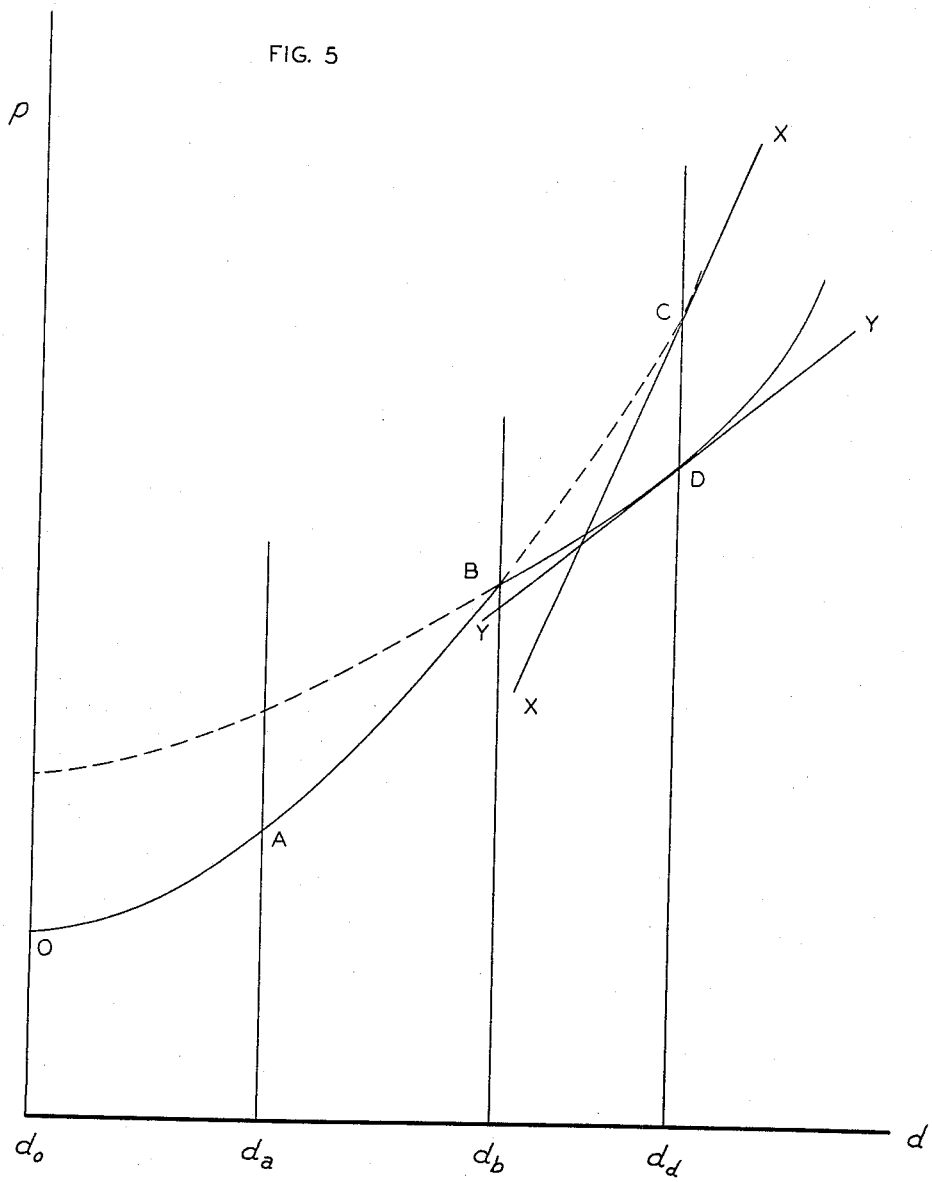

United States Patent Office 2,914,337
Patented Nov. 24, 1959

2,914,337

VEHICLE WHEEL SUSPENSION STRUCTURE

Ralph H. Kress, Kansas City, Mo.

Application November 30, 1956, Serial No. 625,323

10 Claims. (Cl. 280—96.2)

This invention relates to vehicle wheel suspensions.

In conventional vehicle wheel suspensions, road shocks are absorbed by the deflection of metal, which may assume a variety of shapes; regardless of its shape, the metal which is adapted to be deflected is usually called a spring. The spring is of course deflected by being stressed.

A characteristic of spring loading is the variability of the load. Substantially continuous variation of the load on a spring for a vehicle in motion results in fatigue failure of the spring unless a large safety factor is used in the design. When the spring is designed large enough to avoid fatigue failure, it assumes a bulk and weight of considerable proportions.

In most vehicular applications, it is desirable to hold the weight and size (for a given capacity) of the empty vehicle to a minimum in order that the pay load may be a large percentage of the total weight of the loaded vehicle. Thus the weight requirements are in direct conflict with the safety, service, and reliability requirements, which dictate a much larger spring for variable and repetitive stressing of a high periodicity than for a situation in which the stress is nearly constant and is applied only a few times.

In conventional springs, the material stressed is in what is usually called the solid form, as, for example, metal or rubber. Material in the fluid form is not subject to the shortcomings of solids. There are many gases and liquids which are extremely stable under wide variations of temperature and pressure, and would not be adversely affected by any conceivable conditions encountered in the most extreme circumstances. Thus, for all likely load conditions, many gases and liquids cannot be "overloaded" by the sudden application of a high pressure as might be the case under severe shock load, whereas a conventional spring, relying on the stressing of a solid material, might fail.

Devices have been made to employ fluids as the substance "stressed," but many of these prior art devices are of such a nature as to involve failure of the vessel in which the fluid is confined. Such devices are of course subject to the same drawbacks as the more conventional types of metal springs.

It is accordingly an object of this invention to provide a type of vehicle wheel suspension in which the material stressed is not subject to fatigue failure and which does not require weights and sizes as large as conventional springs for a given capacity. This and other objects are accomplished in a vehicle suspension in which a fluid is "deflected" or "stressed" to absorb road shocks.

In the drawings:

Fig. 1 is a top plan view of a vehicle chassis made according to this invention;

Fig. 2 is a view in section on line 2—2 of Fig. 1, but on a larger scale;

Fig. 3 is a view in section on line 3—3 of Fig. 1, but on a much larger scale;

Fig. 4 shows another embodiment of the invention, being a view in section similar to Fig. 3 but showing only the upper portion of the suspension and on a larger scale than Fig. 3; and Fig. 5 is a pressure-displacement graph illustrating the advantages of the embodiment shown in Fig. 4.

Referring now in detail to Figs. 1–3, and particularly to Fig. 1, a vehicle is there shown having a basic supporting structure such as a frame indicated generally at 2. The embodiment there shown includes a pair of laterally spaced supports 4 and 6 forming a part of the basic supporting structure or frame 2. Means to drive the vehicle are provided, and include a power plant 8 located between the laterally spaced supports 4 and 6 and also disposed between dirigible wheels 10 and 12. The power plant 8 is connected in any suitable manner with a pair of drive wheels 14 and 16.

The wheels are carried on the vehicle by means of wheel suspensions indicated generally at 18 and 20. As will be explained in greater detail below, each wheel suspension is an expansible chamber device having a cylinder member 22 and a piston member 24 (Fig. 3), a piston member 24 including a piston 26 and a piston rod 28. One member of the expansible chamber device is secured to the basic supporting structure, and a dirigible wheel is mounted on the other member. Thus, in the embodiment shown in Figs. 2 and 3, the cylinder member 22 is secured to support 4 of the basic supporting structure, and dirigible wheel 10 is mounted on the piston member 24, member 24 being pivotable relative to member 22 to permit steering of the vehicle. Toward this end, a steering arm 30 is provided as an integral part of the wheel axle 32. The steering arm 30 may be connected with suitable steering linkage by conventional means, as for example by a ball 34 provided on the end of steering arm 30 and adapted to cooperate with a socket of any suitable steering linkage.

Referring now in detail to Fig. 3, it can be seen that cylinder member 22 is provided with a large bore 36 and a smaller bore 38. The large bore 36 accommodates piston 26, piston 26 being provided with suitable packing means, as for example the O-ring 40. The small bore 38 accommodates the piston rod 28, and the portion of cylinder member 22 in which bore 38 is formed is also provided with suitable packing means, shown here as an O-ring 42. Thus, the piston member and the cylinder member define an annular space 44, this being the space between the lower face 46 of piston 26 and the shoulder 48, and the bore 36 and the piston rod 28.

Cylinder member 22 is provided with a cylinder head 50, head 50 being secured to the cylinder member in any suitable manner, as by capscrews 52. Cylinder head 50 is provided with a charging valve 54 which may be any one of a number of commercially available check valves permitting fluid to flow under pressure in one direction only and being manually releasable to permit fluid flow in the opposite direction.

In a preferred embodiment of the invention, piston member 24 is hollow. In the embodiment shown in Fig. 3, this hollow consists of a bore 56 in the piston rod 28. Bore 56 is closed at its upper end by piston 26, and at its lower end by a closure 58 which is here shown as welded to piston rod 28. The bore 56, closed at its ends as aforesaid, thus provides a reservoir 60.

Conduit means are provided to connect annular space 44 with the reservoir 60. In the embodiment shown, suitable piping 62 passes through an opening in the piston rod 28, this opening being preferably just below the lower face 46 of piston 26. Piping 62 is secured at its lower end in the closure 58 and communicates with an axial bore 64 which in turn is intersected by a transverse bore 66. Any suitable needle valve 68 may be provided in the lower end of bore 64 which is suitably threaded for the purpose. A lock nut 70 is preferably provided to hold the needle valve 68 in place.

Closure 58 is provided with still another bore 72 which is fitted with a plug 74 to permit charging the reservoir with an incompressible fluid shown at 76. Inasmuch as the preferred embodiment of the invention is intended to employ a combination of a compressible fluid and an incompressible fluid, closure member 58 is fitted with a conduit 78 which is long enough to extend at all times above the level of incompressible fluid in the reservoir 60. At its lower end, conduit 78 is fitted with a suitable gas charging valve 80, similar in principle to the valve 54, discussed above.

Reference is made now to the embodiment shown in Fig. 4. It will be understood by those skilled in the art that the cylinder and piston details not shown in Fig. 4 are the same as those of Fig. 3. Those parts of the device shown in Fig. 4 which have corresponding parts in the embodiment shown in Figs. 1–3 will be identified by reference characters 100 higher than used in the description of the first embodiment. Thus, the cylinder member 22 of Fig. 3 corresponds to a similar cylinder member 122 in the embodiment shown in Fig. 4; where the embodiment shown in Fig. 3 shows a piston member 24, the embodiment shown in Fig. 4 is provided with a piston member 124, etc.

The only significant difference between the embodiment shown in Fig. 4 and that shown in Figs. 1–3 is the addition, in Fig. 4, of a third pressure chamber 182. The third pressure chamber is placed in communication with one of the pair of opposed pressure chambers. Thus, the space in bore 136 above the piston and the annular space 144 below the piston constitute opposed pressure chambers. The third pressure chamber 182 is placed in communication with one of the pair of opposed pressure chambers. In the embodiment shown, the third pressure chamber is adjacent to and has a wall in common with the pressure chamber with which it is placed in communication.

In the embodiment shown, the third pressure chamber 182 takes the form of a modified cylinder head replacing the cylinder head 50 shown in Fig. 3, and held in place by longer threaded members 152. The common wall is a wall or partition 184 formed integral with the pressure chamber (modified cylinder head) 182. The wall 184 has a passage through it identified by 186. A valve 188 is placed in the passage 186.

In the embodiment shown, the valve 188 takes the form of a check valve positioned to permit flow into the third pressure chamber, and conversely, to prevent flow from the third pressure chamber when valve 188 is acting as a check valve.

Valve 188 is mounted for movement along a given axis A—A to open and close the passage 186. Guide means, preferably located in the third pressure chamber, are provided as shown at 190 and serve to guide valve 188 for movement along axis A—A. The guide means in the embodiment shown take the form of an elongated member such as a piece of tubing centered in a closure plug 192 for the third pressure chamber. The lower end of the guide means 190 engages an opening in valve 188.

Guide means 190 is preferably hollow and at its upper end communicates with a charging valve 154. The guide means 190 is perforated throughout its length as shown at 194.

Reference was made above to the fact that valve 188 is a check valve and that, operating as a check valve, it prevents the flow of fluid out of chamber 182. Means are provided to open and close valve 188 positively according to the position of the wheel—relative to the basic supporting structure. In the embodiment shown, this is accomplished by piston 124 engaging actuating means. More specifically, piston 124 engages a member 196 formed integral with valve 188 and, to assist in movement of valve 188 along axis A—A, piston 124 is provided with a substantially central recess 198 which engages the lower end of member 196. In the embodiment shown, member 196 is simply a hollow valve stem formed integral with the valve 188. Member 196 is closed at its lower end in order to complete the seal between pressure chamber 182 and the adjacent pressure chamber partially defined by bore 136.

Operation

Reference will be first to Fig. 3 for a discussion in detail of the operation of the embodiment there shown. The pressure chamber defined by bore 36, cylinder head 50, and the upper face of piston 26 is charged to the desired pressure with a compressible, preferably dry, fluid. A preferred fluid is nitrogen, although of course air can also be used. A thin film of oil is preferably provided on top of piston 26 and serves a dual purpose; namely lubrication and the prevention of metal to metal contact at the upper limits of the stroke of piston 26. The annular space 44 is charged with an incompressible fluid, such as oil, and a pool of oil 76 is provided in the reservoir 60. The annular space 44 is kept in communication with the pool of oil 76 by means of the conduit 62. Oil can be added to or taken from the reservoir by removing plug 74. The space above the pool of oil in the reservoir is preferably charged with the same kind of compressible fluid as is used above the piston. The pressure of this compressible fluid can be controlled through the charging valve 80 and conduit 78.

As wheel 10 strikes a "bump" in its path, it moves upward, substantially vertically, in relation to the basic supporting structure of the vehicle. In a conventional vehicle spring suspension, the shock of the sudden upward movement would be absorbed by deflection of the metal spring. In the embodiment of this invention, no reliance is placed on the stressing of metal to absorb the shock. Instead, the shock is absorbed by compression of the compressible fluid in the pressure chamber above the piston.

In the meantime, it must be borne in mind that there is a second pressure chamber opposed to the pressure chamber above the piston, this being the pressure chamber formed by the annular space 44. As piston 26 moves upward, the volume of anular space 44 increases. Cavitation of the incompressible fluid in this space is substantially prevented by the flow of fluid from the reservoir 60 through passages 66 and 64, and conduit 62, into the annular space 44. However, even if oil cannot flow through these passages quickly enough to prevent cavitation entirely, there is no appreciable interference by such cavitation with the upward movement of piston 26. It will of course be borne in mind that the space above the pool of oil 76 in reservoir 60 is charged with a compressible fluid under pressure. Accordingly, the oil in the pool 76 is under considerable pressure and tends to "follow" the upward movement of piston 26 quite closely.

As the wheel 10 rides off the "bump," the pressure in the chamber above the piston attempts to restore the piston to its original position. However, as piston 26 begins to move downward in relation to cylinder 22, it encounters the substantially incompressible fluid in the annular space 44; piston 26 cannot move downward without displacing oil from the space 44 into the reservoir 60 by way of conduit 62 and passages 64 and 66. In moving through passages 64 and 66, the oil must flow through the variable restriction provided by needle valve 68. Thus, the fact that oil must be displaced from the annular chamber or space 44, and the fact that resistance to such movement is offered both by the needle valve and the pressure of the gas above the pool 76—both of these conditions serve to retard the flow of oil to some extent and give a shock absorber action to the suspension. The rate of flow of oil through the conduit 62 can of course be varied by varying the position of needle valve 68.

The action of the suspension when the wheel encounters a hole in its path is of course similar to the action described above when the wheel rides off a bump. In this connection, however, it should be borne in mind that the pressure of the compressible fluid in reservoir 60 is desirably such as to prevent a complete displacement of incompressible fluid or oil from the annular chamber 44; in this way, the suspension avoids metal to metal contact between the surfaces 46 and 48 in the lower limits of the stroke of the piston.

To steer the vehicle, the dirigible wheels 10 and 12 are steered by means of suitable steering linkage. Steering is accomplished by turning the dirigible wheels about the axes of their expansible chamber devices. More specifically, the piston member turns inside the cylinder member about their common axis. This turning or pivoting motion in no way interferes with the functioning of the suspension as means to absorb road shock.

Reference will now be made to Figs. 4 and 5 for a discussion of the operation of the embodiment shown in Fig. 4. In Fig. 5, there is shown a pair of curves to illustrate the variation in the pressure above the piston as the wheel moves from an off-the-ground position $d_o$ to a position as far up as it can go ($d_d$). Pressure in the chamber above the piston is plotted along the vertical axis, and wheel displacement upward is plotted along the horizontal axis. The portion OB of the solid line curve indicates the pressure changes in the chamber above the piston and defined by bore 136 and wall 184, with valve 188 closed, as the piston moves from $d_o$ to $d_b$.

The dotted line portion BC is an extrapolation of the curve OB and indicates the pressure changes which would take place if valve 188 were held closed as the piston moves upward beyond position $d_b$. As is evident from the graph, the rate of change of pressure increases constantly and gradually along the entire curve OC. As the piston approaches the $d_b$ position, the pressure above it is increasing at a fairly rapid rate, and the rate of pressure increase is also increasing. As the piston approaches the $d_b$ position, the "spring" action of the suspension is quite stiff, and the action would get stiffer if the pressure curve were to follow the path BC.

However, in the embodiment shown in Fig. 4, as the piston 126 reaches the $d_b$ position, the bottom of recess 198 engages the end of valve stem 196. Continued upward movement of piston 126 opens valve 188 and exposes the upper face of piston 126 to the combined volumes of the third pressure chamber and the volume remaining between the piston and the wall 184. This sudden increase in volume causes the pressure to rise along the curve BD as the piston moves from position $d_b$ to $d_d$. The result is a much softer "spring" than would be possible without the third pressure chamber. This fact is best illustrated by comparing the slope of curve BC at point C (line X—X) with the slope of curve BD at point D (line Y—Y). Obviously, line X—X is much steeper than line Y—Y, indicating a higher "spring rate" and thus a stiffer "spring" without the third pressure chamber, than with it.

Consider now the action of valve 188 and its effect as piston 126 moves downward from position $d_d$, through position $d_a$, and continues on to position $d_o$. (Position $d_a$ represents the vehicle unloaded, static, position of the piston.) If the pressure chamber (assuming one chamber only) above the piston were large enough to provide as soft a spring action as might be desirable at the position $d_d$, then, as the piston moved downward from position $d_b$, there would be an undesirably large volume of air at a given pressure pushing downward on the piston. Inasmuch as the amount of rise of the vehicle when the load is drastically reduced is a function of the volume above the piston, it will readily be seen that a wheel suspension with no means to trap a portion of the volume will permit a greater amount of rise of the vehicle under these conditions for a given "spring softness," than one which does provide such means. Conversely, for a given permissible total vertical wheel travel relative to the basic supporting structure, a wheel suspension with a third pressure chamber will have a smaller variation in the "spring rate" between the extremes of wheel travel than one not so designed.

To the extent that the wheel suspension of Fig. 4 resembles that of Fig. 3, the operation will be similar, and the function of the opposed fluid pressure chamber (beneath the piston 126) in cooperation with the reservoir 160 will be understood by those skilled in the art and need not be repeated here in view of the discussion above of the operation of the embodiment of Fig. 3.

It will be seen from the foregoing that this invention provides vehicle wheel suspension means of a greatly simplified structure, in which road shocks are absorbed by stressing one or more fluids rather than a solid, avoiding fatigue failures without making the equipment unduly large and heavy. Other advantages will be apparent to those skilled in the art.

While there are in this application specifically described two forms which the invention may assume in practice, it will be understood that those forms of the same are shown for purposes of illustration and that the invention may be modified and embodied in various other forms without departing from its spirit or the scope of the appended claims.

What is claimed is:

1. A wheel suspension for a vehicle having a basic supporting structure, comprising an expansible chamber device having a cylinder member and a suitably packed piston member, means for securing one member to said structure and the other member to the wheel, a pressure chamber between one face of the piston and one end of the cylinder, a second pressure chamber between the opposite face of the piston and the other end of the cylinder, a third pressure chamber, all three pressure chambers being sealed against communication with the atmosphere and being under pressure greater than atmospheric, and means to place the third pressure chamber in communication with one of the other two pressure chambers during only a portion of the stroke of the piston member.

2. In a wheeled vehicle having a basic supporting structure, an expansible chamber device having a pair of opposed pressure chambers sealed against communication with the atmosphere and with each other and being under pressure greater than atmospheric, means connecting the device to a vehicle wheel and the basic supporting structure whereby vertical movement of the wheel relative to said structure effects pressure changes in said chambers, a third pressure chamber adjacent to and having a wall in common with one of said pair of chambers, the wall having a passage therethrough, a check valve in the passage, and means to control the check valve in accordance with the vertical position of the wheel relative to the expansible chamber device.

3. In a wheeled vehicle having a basic supporting structure, an expansible chamber device having a chamber filled with a compressible fluid, a second chamber at all times sealed from and opposed to the first and filled with an incompressible fluid, a reservoir containing a compressible fluid and an incompressible fluid, conduit means connected to permit the flow of incompressible fluid between the second chamber and the reservoir, means connecting the device to a vehicle wheel and the basic supporting structure whereby vertical movement of the wheel relative to said structure effects fluid flow through the conduit means and effects a gradual change in pressure in the first-named chamber, said pressure increasing at an increasing rate for wheel movement in one direction, and means to decrease the rate of increase for wheel movement in said direction.

4. In a wheeled vehicle having a basic supporting structure, an expansible chamber device having a pair of opposed pressure chambers sealed against communication with each other, means connecting the device to a vehicle wheel and the basic supporting structure whereby vertical movement of the wheel relative to said structure effects pressure changes in said chambers, a third pressure chamber adjacent to and having a wall in common with one of said pair of chambers, the wall having a passage therethrough which when open provides the sole means of communication between the two pressure chambers having said common wall, a valve in the passage and movable along a given axis to open and close the passage and thus respectively to permit and to prevent communication between the two pressure chambers having said common wall, and means in the third pressure chamber to guide the valve for movement along said axis.

5. In a wheeled vehicle having a basic supporting structure and a pair of dirigible wheels, suspension means for the dirigible wheels consisting of: a pair of expansible chamber devices each having a cylinder member and a hollow piston member; means for securing one member of each said device to the supporting structure, a dirigible wheel being mounted on the remaining member of each device; means to pivot one member of each device relative to the other member about the cylinder axis to effect steering of the vehicle; a pressure chamber in each device between one face of its piston and one end of its cylinder; a second pressure chamber in each device sealed from and opposed to the first-named pressure chamber thereof; both pressure chambers being sealed against communication with the atmosphere and being under pressure greater than atmospheric; and means connecting the second chamber of each device with the hollow of the piston thereof.

6. An independent suspension system for a wheeled vehicle having a basic supporting structure and a pair of dirigible wheels, the suspension system consisting of: a pair of expansible chamber devices each having a cylinder member and a piston member; means securing one member of each said device to the supporting structure, a dirigible wheel being mounted on the remaining member of each device; means to pivot one member of each device relative to the other member about the cylinder axis to effect vehicle steering; a pressure chamber in each device between one face of its piston and one end of its cylinder; a second pressure chamber in each device sealed from and opposed to the first-named pressure chamber thereof; both pressure chambers being at all times sealed against communication with the atmosphere during normal operation and being under pressure greater than atmospheric; and means to permit fluid flow into and out of one of the pressure chambers.

7. An independent suspension system for a wheeled vehicle having a basic supporting structure and a pair of dirigible wheels, the suspension system consisting of: a pair of expansible chamber devices each having a cylinder member and a piston member; means securing one member of each said device to the supporting structure, a dirigible wheel being mounted on the remaining member of each device; means to pivot one member of each device relative to the other member about the cylinder axis to effect vehicle steering; a chamber for a compressible fluid in each device between one face of its piston and one end of its cylinder; a chamber for an incompressible fluid in each device sealed from and opposed to the first-named chamber; both pressure chambers being sealed against communication with the atmosphere and being under pressure greater than atmospheric; and means to permit fluid flow from and to the second-named chamber.

8. In a wheeled vehicle having a basic supporting structure, an expansible chamber device having a chamber filled with a compressible fluid, a second chamber sealed from and opposed to the first and filled with an incompressible fluid, a reservoir containing a compressible fluid and an incompressible fluid, conduit means connected to permit the flow of incompressible fluid between the second chamber and the reservoir, means connecting the device to a vehicle wheel and the basic supporting structure whereby vertical movement of the wheel relative to said structure effects fluid flow through the conduit means and effects pressure changes in the first-named chamber, and means to admit or discharge compressible fluid to or from respectively the reservoir and including valved conduit means extending through the incompressible fluid and terminating at its one end above the level of incompressible fluid and at its other end in an exposed wall of the reservoir.

9. In a wheeled vehicle having a basic supporting structure and a pair of dirigible wheels, suspension means for the dirigible wheels each of which has a chamber filled with a compressible fluid, a second chamber sealed from and opposed to the first and filled with an incompressible fluid, a reservoir containing a compressible fluid and an incompressible fluid, conduit means connected to permit the flow of incompressible fluid between the second chamber and the reservoir, means connecting the device to a dirigible wheel and the basic supporting structure whereby vertical movement of the wheel relative to said structure effects fluid flow through the conduit means and effects pressure changes in the first-named chamber, and means to admit or discharge compressible fluid to or from respectively the reservoir and including valved conduit means extending through the incompressible fluid and terminating at its one end above the level of incompressible fluid and at its other end in an exposed wall of the reservoir.

10. In a wheeled vehicle having a basic supporting structure, an expansible chamber device having a pair of opposed pressure chambers sealed against communication with each other, means connecting the device to a vehicle wheel and the basic supporting structure whereby vertical movement of the wheel relative to said structure effects pressure changes in said chambers, a third pressure chamber adjacent to and having a wall in common with one of said pair of chambers, the wall having a passage therethrough, a valve in the passage and movable along a given axis to open and close the passage, and means in the third pressure chamber to guide the valve for movement along said axis and including an elongated member secured in the third chamber and passing through an opening in the valve.

References Cited in the file of this patent

UNITED STATES PATENTS

| | | |
|---|---|---|
| 1,855,064 | Messier | Apr. 19, 1932 |
| 2,123,388 | Viguerie | July 12, 1938 |
| 2,389,849 | Gruss | Nov. 27, 1945 |
| 2,567,144 | Butterfield | Sept. 4, 1951 |
| 2,814,482 | Anderson et al. | Nov. 26, 1957 |

FOREIGN PATENTS

| | | |
|---|---|---|
| 656,012 | France | Dec. 24, 1928 |

OTHER REFERENCES

Publication: "Design News," June 1, 1953, vol. 8, No. 11, pp. 10–11.